(12) United States Patent
Hamada

(10) Patent No.: US 9,703,231 B2
(45) Date of Patent: Jul. 11, 2017

(54) IMAGE FORMATION OPTICAL SCANNER, IMAGE FORMING APPARATUS, AND NON-TRANSITORY COMPUTER-READABLE RECORDING MEDIUM STORING IMAGE FORMING APPARATUS OPTICAL SCANNING PROGRAM

(71) Applicant: Konica Minolta, Inc., Chiyoda-ku, Tokyo (JP)

(72) Inventor: Takatoshi Hamada, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/077,687

(22) Filed: Mar. 22, 2016

(65) Prior Publication Data
US 2016/0327885 A1 Nov. 10, 2016

(30) Foreign Application Priority Data
May 8, 2015 (JP) .................................. 2015-095618

(51) Int. Cl.
| | |
|---|---|
| G06F 15/00 | (2006.01) |
| G03G 15/043 | (2006.01) |
| H04N 1/024 | (2006.01) |
| H04N 1/113 | (2006.01) |

(52) U.S. Cl.
CPC ....... *G03G 15/043* (2013.01); *H04N 1/02418* (2013.01); *H04N 1/113* (2013.01); *G03G 15/0435* (2013.01)

(58) Field of Classification Search
USPC ....................................................... 358/1.13
See application file for complete search history.

(56) References Cited

U.S. PATENT DOCUMENTS

2015/0338762 A1* 11/2015 Nakagawa .......... G03G 15/043
399/51

FOREIGN PATENT DOCUMENTS

| JP | 61-232765 | 10/1986 |
|---|---|---|
| JP | 62-160472 | 7/1987 |
| JP | 11-65212 | 3/1999 |

(Continued)

OTHER PUBLICATIONS

Notification of Reasons for Refusal dated Apr. 28, 2017 for JP Application No. 2015-095618 with English translation, total of 8 pages.

*Primary Examiner* — Saeid Ebrahimi Dehkord
(74) *Attorney, Agent, or Firm* — Squire Patton Boggs (US) LLP

(57) ABSTRACT

An optical scanner includes a light source; a rotating polygon mirror that reflects and deflects the light beam output from the light source; a drive unit that rotationally drives the rotating polygon mirror; a beam detection unit that detects the light beam; and a control unit that controls the light source and the drive unit. The control unit can control the drive unit with a detection result of the beam detection unit, and adjust a rotational speed of the rotating polygon mirror. The control unit has a high definition mode in which the rotational speed of the rotating polygon mirror is controlled with high accuracy at the time of normal light beam irradiation, and a light source life mitigation mode in which light beam irradiation is performed by controlling the output of the light source with keeping rotation of the rotating polygon mirror during standby.

10 Claims, 9 Drawing Sheets

(56) References Cited

FOREIGN PATENT DOCUMENTS

| | | |
|---|---|---|
| JP | 2001-212999 | 8/2001 |
| JP | 2004-126228 | 4/2004 |
| JP | 2004-223908 | 8/2004 |
| JP | 2005-47265 | 2/2005 |
| JP | 2009-10602 | 1/2009 |
| JP | 2009-297917 | 12/2009 |

* cited by examiner

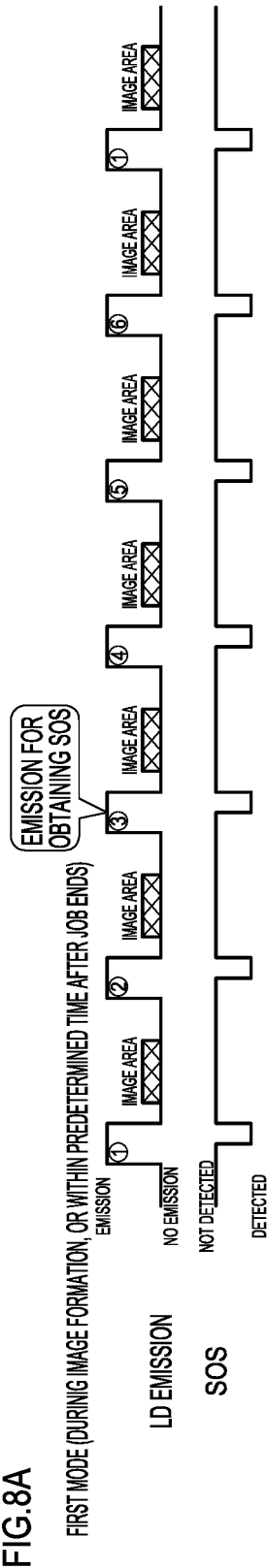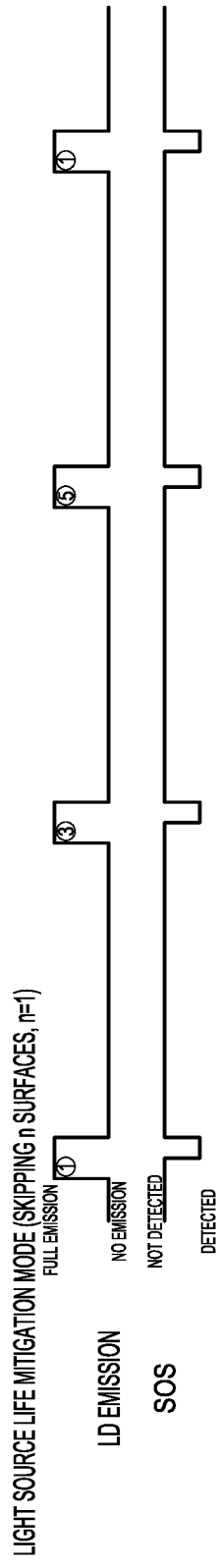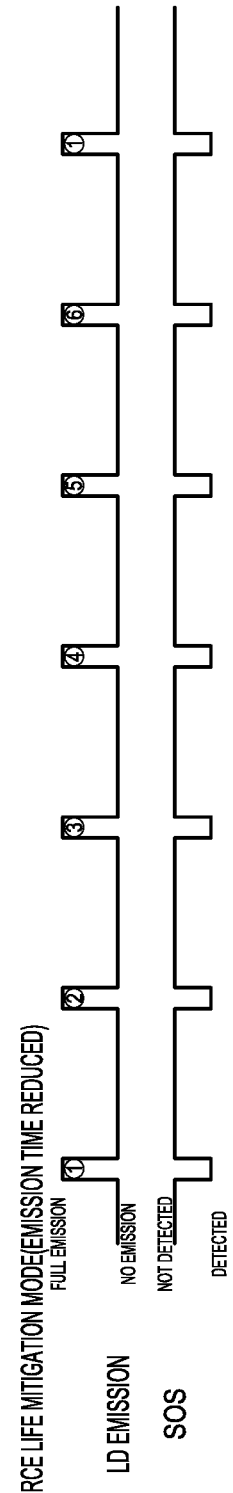

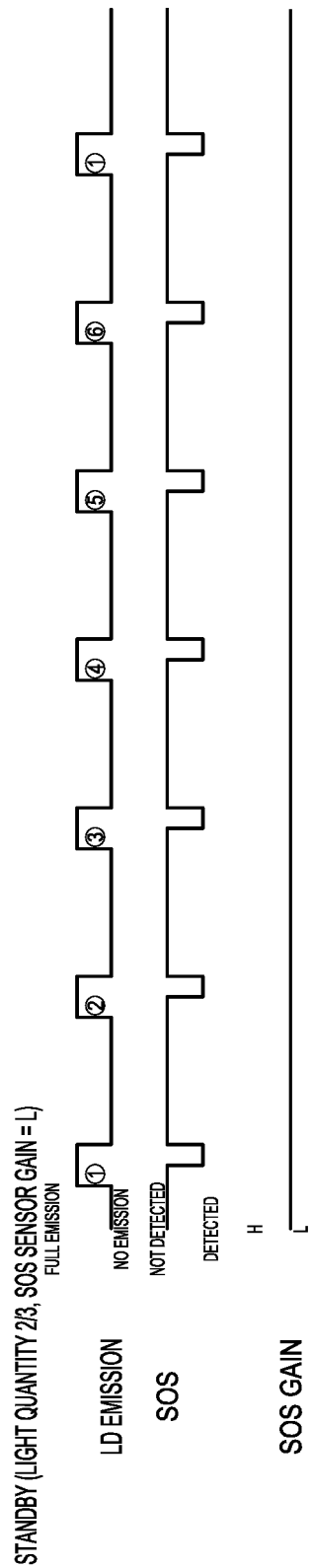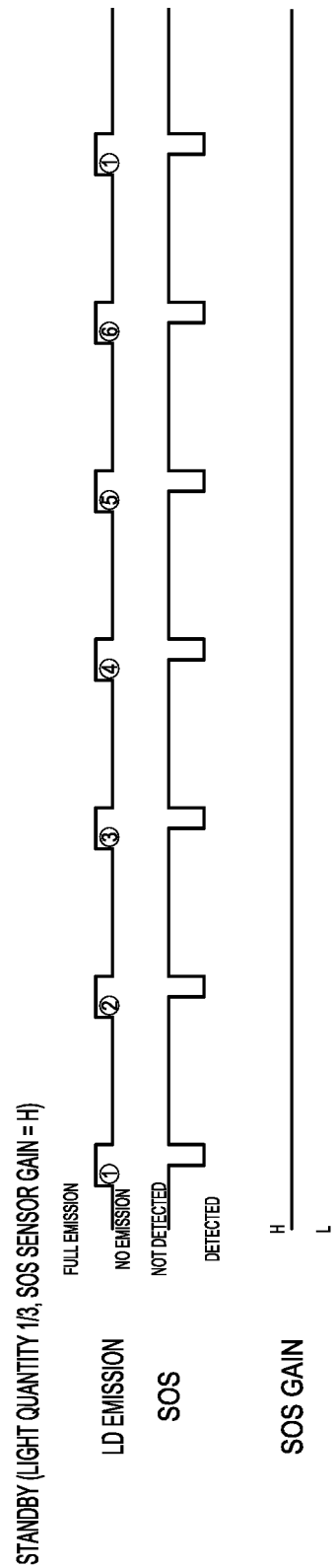

IMAGE FORMATION OPTICAL SCANNER, IMAGE FORMING APPARATUS, AND NON-TRANSITORY COMPUTER-READABLE RECORDING MEDIUM STORING IMAGE FORMING APPARATUS OPTICAL SCANNING PROGRAM

CROSS-REFERENCE TO RELATED APPLICATIONS

The present application claims priority under 35 U.S.C. §119 to Japanese Patent Application No. 2015-095618, filed May 8, 2015. The contents of this application are incorporated herein by reference in their entirety.

BACKGROUND OF THE INVENTION

Field of the Invention

The present invention relates to an image formation optical scanner to be used for exposure in an image forming apparatus, an image forming apparatus equipped with the image formation optical scanner, and a non-transitory computer-readable recording medium storing an image forming apparatus optical scanning program.

Description of the Related Art

In an electrophotographic image forming apparatus such as a laser printer, a digital copier, or a normal paper facsimile machine, a laser beam modulated with an image signal is reflected at a rotating polygon reflecting mirror (polygon mirror), whereby the electrified surface of a photoreceptor is scanned with the laser beam. Thereby, an electrostatic latent image is formed on the electrified surface.

As such an image forming apparatus, there is proposed a device in which a light receiving sensor (=SOS (Start of Scan) sensor) is provided at a predetermined position before the position of starting laser scanning of a photoreceptor, and a forcibly emitted laser beam is detected by the SOS sensor. Based on the detected signal, output start timing of an image signal on each scanning line is controlled, and the rotational speed of the polygon mirror is controlled.

Japanese Patent Laid-Open No. 2004-126228 describes an apparatus having a plurality of laser light sources. When a polygon motor is actuated, the apparatus turns on an A-laser, and after detecting a BD signal based on the A-laser, turns off the A-laser and turns on a B-laser, and after detecting a BD signal based on the B-laser, turns off the B-laser and then forcibly turns on the A-laser again. This means that the A-laser and the B-laser are alternately turned on each time a BD signal is detected. Thereby, the lives of the laser light sources are allowed to be almost the same.

Further, Japanese Patent Laid-Open No. 2001-212999 describes that in the case of changing a resolution, resolution conversion is performed by thinning out surfaces of a rotating polygon mirror, without changing the rotational speed of the rotating polygon mirror. If resolution change is performed by changing the process speed, it takes time until the speed is stabilized, so that it takes time until printing. Further, as light emitting elements are lighted on the entire surfaces of the rotating polygon mirror, the lives of the light emitting elements are shortened. According to the above configuration, as there is no need to obtain a main scanning synchronous signal for the surface to be thinned out, it is possible to elongate the lives of the light emitting elements.

Further, in a polygon motor which is rotationally controlled by an SOS signal, it is needed to emit a laser in order to obtain an SOS signal, not only during printing performed by the image forming apparatus but also during standby.

Japanese Patent Laid-Open No. 2009-297917 describes that in a first mode which requires rotational accuracy of a polygon motor, rotation control is performed by BD control, while in a second mode which does not require rotational accuracy of the polygon motor, rotation control of the polygon motor is performed by FG control. The first mode includes a mode of forming a print image, a mode of forming a patch image, a mode of measuring a SOS cycle, and the like, and the second mode includes a mode at the time of flying start and the like.

As described above, if LD emission is required even during a long standby time, the life of a laser emission source becomes a problem to be solved. In particular, a standby time is very long, compared with the time taken for drawing for the number of durable sheets of an image forming apparatus, and laser emission during that time largely affects the life of the laser emission source.

However, in Japanese Patent Laid-Open No. 2004-126228 and Japanese Patent Laid-Open No. 2001-212999, no consideration is given to mitigation of a load affecting the life of a laser source during standby.

Further in Japanese Patent Laid-Open No. 2009-297917, while a mode is switchable depending on a difference in rotational accuracy, in FG control which is a second mode not requiring rotational accuracy, rotational accuracy deteriorates due to variations in magnetization, and further, the noise becomes large by rotation during standby. In particular, as driving of other functions in the image forming apparatus is stopped during standby, there is a problem that the driving noise of the rotating polygon mirror becomes remarkable and offends the ear. On the other hand, if normal SOS control having less noise during standby is performed, as described above, a problem regarding the life of the laser emission source is caused.

The present invention has been made with the above-described situation as a background. An object of the present invention is to provide an image formation optical scanner, an image forming apparatus, and a non-transitory computer-readable recording medium storing an image forming apparatus optical scanning program, enabling the life of a laser light source to be elongated during standby without causing a problem of loud noise.

SUMMARY OF THE INVENTION

That is, to achieve at least one of the abovementioned objects, an image formation optical scanner reflecting one aspect of the present invention is an optical scanner configured to perform scanning with a light beam and perform irradiation on a photoreceptor for image formation. The optical scanner includes:

a light source;

a rotating polygon mirror on which the light beam output from the light source is reflected at a plurality of mirror surfaces and is deflected;

a drive unit that rotationally drives the rotating polygon mirror;

a beam detection unit that detects the light beam; and a control unit that controls the light source and the drive unit.

The control unit has a function of controlling the drive unit with a detection result of the beam detection unit, and adjusting a rotational speed of the rotating polygon mirror.

The control unit has a high definition mode in which the rotational speed of the rotating polygon mirror is controlled with high accuracy at the time of normal light beam irradiation, and a light source life mitigation mode in which light beam irradiation is performed by controlling the output of the light source with keeping rotation of the rotating polygon mirror during standby in which image formation is not performed.

In the image formation optical scanner according to the abovementioned aspect, it is preferable that the control unit cyclically outputs the light beam from the light source, and in the light source life mitigation mode, the control unit performs rotation control of the drive unit by the light beam which is output from the light source at surfaces of the rotating polygon mirror, while skipping n (n represents one or larger natural number) surfaces of the rotating polygon mirror, and is reflected at the rotating polygon mirror.

In the image formation optical scanner according to the abovementioned aspect, it is preferable that, in the light source life mitigation mode, the control unit sets a light emitting period in the light source to be comparatively shorter than a light emitting period of a normal time for each cycle.

In the image formation optical scanner according to the abovementioned aspect, it is preferable that, in the light source life mitigation mode, the control unit sets an output of a light emission quantity in the light source to be comparatively lower than a light emission quantity of a normal time.

In the image formation optical scanner according to the abovementioned aspect, it is preferable that, in the light source life mitigation mode, the control unit sets an output of a light emission quantity in the light source to be comparatively lower than a light emission quantity of a normal time, and also sets a gain of the beam detection unit to be comparatively larger than a gain of the normal time.

In the image formation optical scanner according to the abovementioned aspect, it is preferable that, at a time of startup of the optical scanner, the control unit gradually increases the light emission quantity in the light source, acquires and stores the light emission quantity when the light beam is detected by the beam detection unit for a first time, and based on a detected value, determines the light emission quantity to be lowered in the light source life mitigation mode.

In the image formation optical scanner according to the abovementioned aspect, it is preferable that a plurality of the light sources are provided, and in the light source life mitigation mode, the control unit outputs the light beam while switching outputs from the light sources.

To achieve at least one of the abovementioned objects, an image forming apparatus reflecting one aspect of the present invention includes an exposing device having the optical scanner according to an aspect of the present invention; and a photoreceptor in which an image is formed by the exposing device, wherein a control unit that controls the optical scanner performs control of image formation in the image forming unit.

In the image forming apparatus according to the abovementioned aspect, it is preferable that the control unit switches a mode from the high definition mode to the light source life mitigation mode when a subsequent print command does not come within a predetermined time after an end of printing.

To achieve at least one of the abovementioned objects, a non-transitory computer-readable recording medium storing an image forming apparatus optical scanning program reflecting one aspect of the present invention is a non-transitory computer readable recording medium storing an optical scanning program to be executed in an optical scanner. The optical scanner is configured such that a light beam output from a light source irradiates a rotating polygon mirror on which the light beam is reflected at a plurality of mirror surfaces and is deflected, that irradiation is made to a photoreceptor for image formation, and that the light beam reflected at the rotating polygon mirror is detected and a rotational speed of the rotating polygon mirror is adjusted based on the detection result.

The program includes a high definition step in which the rotational speed of the rotating polygon mirror is controlled with high accuracy at the time of performing normal light beam irradiation for image formation, and a light source life mitigation step in which light beam irradiation is performed by controlling the output of the light source with keeping rotation of the rotating polygon mirror during standby in which image formation is not performed.

BRIEF DESCRIPTION OF THE DRAWINGS

FIGS. 8A, 8B and 8C are diagrams exemplary illustrating time charts regarding light source outputs in a light source life mitigation mode; and FIGS. 9D and 9E are diagrams illustrating other exemplary time charts regarding light source outputs in the light source life mitigation mode.

DETAILED DESCRIPTION OF THE PREFERRED EMBODIMENT

Hereinafter, an embodiment of the present invention will be described based on the accompanying drawings.

Figure 1:
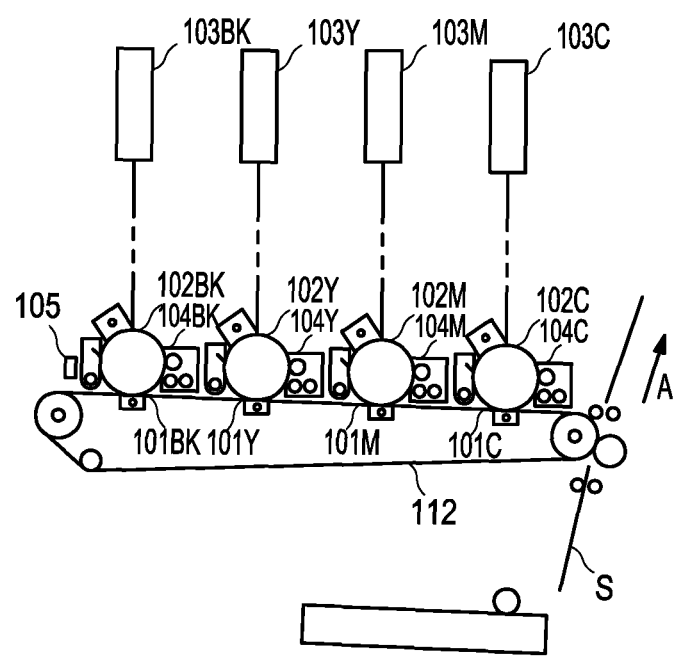
FIG. 1 is a diagram illustrating an outline of an image forming unit provided to an image forming apparatus according to an embodiment of the present invention.

FIG. 1 is a schematic diagram illustrating a configuration of an image forming unit 100 in an image forming apparatus of a tandem laser color type.

Image forming stations 101C, 101M, 101Y, and 101BK for forming images in respective colors are disposed along one surface of an intermediate transfer belt 112. The image forming station 101C is used for forming a cyan image, the image forming station 101M is used for forming a magenta image, the image forming station 101Y is used for forming a yellow image, and the image forming station 101BK used for forming a black image.

The image forming stations 101C, 101M, 101Y, and 101BK include photoconductor drums 102C, 102M, 102Y, and 102BK (hereinafter also collectively referred to as a photoconductor drum 102), laser scanning optical units 103C, 103M, 103Y, and 103BK (hereinafter also collectively referred to as a laser scanning optical unit 103) each of which emits a light beam, developing units 104C, 104M, 104Y, and 104BK, cleaners, and the like, respectively. The laser scanning optical units 103C, 103M, 103Y, and 103BK correspond to an image formation optical scanner of the present invention, and the photoconductor drums 102C, 102M, 102Y, and 102BK corresponds to a photoreceptor of the present invention.

Operation of the image forming unit 100 will be described. In the respective image forming stations 101C, 101M, 101Y, and 101BK, light beams are lighted based on image data by the laser scanning optical units 103C, 103M, 103Y, 103BK to thereby form latent images on the photoconductor drums 102C, 102M, 102Y, and 102BK. The latent images are then developed by the developing units 104C, 104M, 104Y, and 104BK.

The images formed on the photoconductor drums 102C, 102M, 102Y, and 102BK are overlaid on the intermediate transfer belt 112 such that the images of cyan, magenta, yellow, and black are placed on the same position. After detecting, by a sensor not shown, an arrival of a transfer material S, conveyed in an arrow A direction, the image is transferred on the transfer material S whereby a full-color image is formed. Further, in order to perform overlay scanning so as to allow the images in respective colors to be placed at the same position on the intermediate transfer belt 112, a resist correction image is written and is detected by a resist sensor not shown, whereby emission timing of the respective light beams are adjusted.

Figure 2:
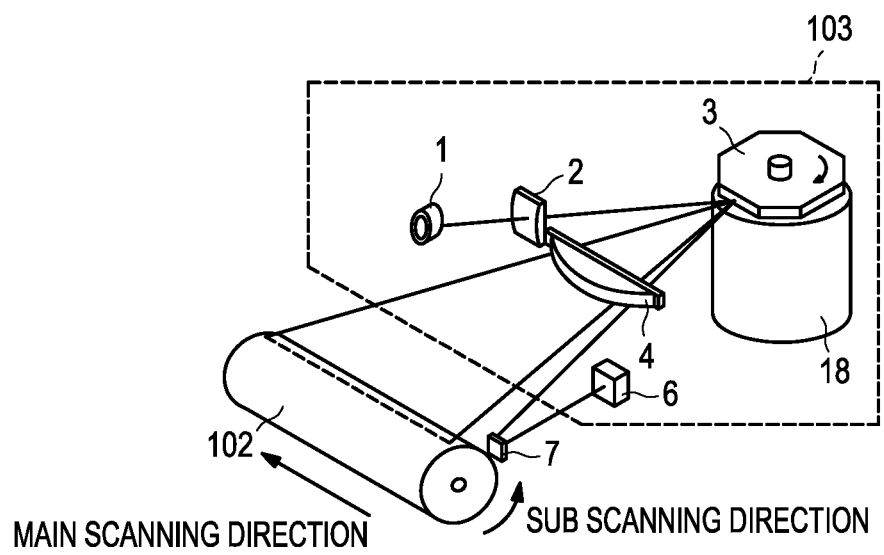
FIG. 2 is a diagram illustrating an outline of a laser scanning optical unit of the same.

FIG. 2 illustrates an outline of a laser scanning optical unit 103, in which the photoconductor drum 102 and peripheral elements thereof are shown, besides the laser scanning optical unit 103.

The laser scanning optical unit 103 includes a laser diode 1, a collimator lens 2, a polygon mirror 3, a polygon motor 18, and a scanning lens 4. The laser diode 1 corresponds to a light source of the present invention, and the polygon mirror 3 corresponds to a rotating polygon mirror of the present invention. The polygon motor 18 corresponds to a drive unit of the present invention which drives the rotating polygon mirror.

The laser diode 1 generates a laser beam, that is, a light beam. There is also one which forms an image by a plurality of beams. The collimator lens 2 converges a laser beam of diffused light, emitted from the laser diode 1, into parallel light. The polygon mirror 3 is a regular polygonal plate-like member, and the respective side faces thereof form reflective surfaces. The polygon mirror 3 is configured to be rotated at a constant speed by the polygon motor 18. Thereby, a reflected laser beam is scanned in the axial direction of the photoreceptor 102. The laser beam reflected at the polygon mirror 3 is made to irradiate the photoreceptor 102 through the scanning lens 4.

In the vicinity of one end of the photoconductor drum 102, a reflective mirror 7 is provided. Further, at a position where a laser beam reflected at the reflective mirror 7 is received, a start of scan sensor (hereinafter referred to as an SOS sensor) 6 is disposed. They are used to synchronize writing of a latent image onto the photoconductor drum 102 based on image data. The configuration shown in FIG. 2 is the same for the respective colors of C, M, Y, and K.

Figure 3:
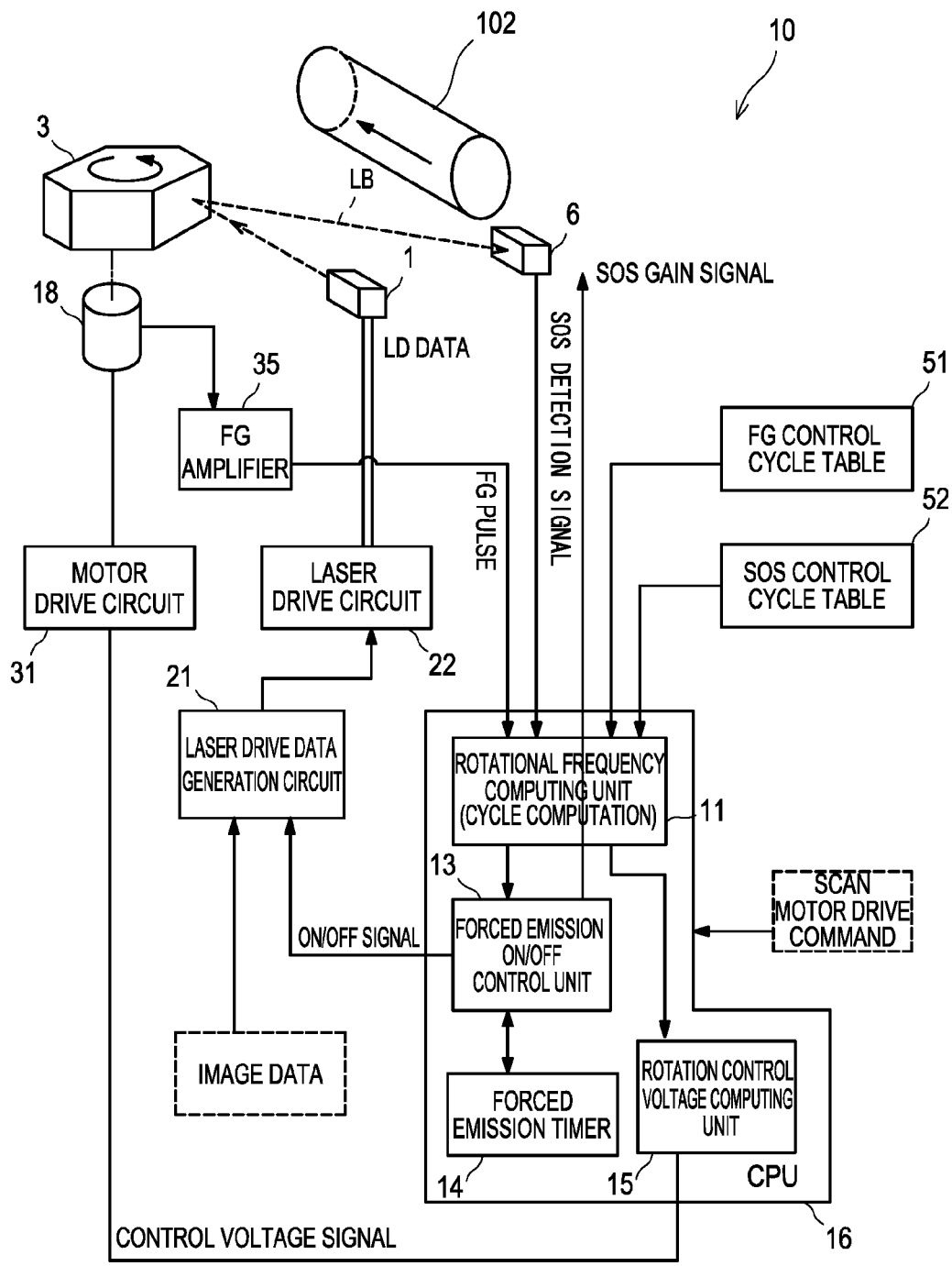
FIG. 3 is a diagram illustrating functional blocks of a control unit 10 which controls a laser scanning optical unit of the same.

FIG. 3 illustrates functional blocks of the control unit 10 which controls the laser scanning optical unit.

The present device is a device in which a surface of the photoconductor drum 102, rotated in the sub scanning direction at a constant speed by a main motor not shown, is scanned repeatedly in an arrow direction shown in the figure with a laser beam LB reflected at the polygon mirror 3, whereby an electrostatic latent image is formed on the electrified surface of the photoconductor drum 102.

Image data corresponding to the electrostatic latent image is read from a recording medium such as a CD-ROM, read by an image scanner, or obtained through a communication network, for example, and is supplied to a laser drive data generation circuit 21. The laser drive data generation circuit 21 creates drive data of the laser diode 1 in accordance with the input image data, and supplies it to the laser drive circuit 22. The laser drive circuit 22 drives the laser diode 1 in accordance with the drive data. Thereby, laser light is output from the laser diode 1 to the polygon mirror 3 and reflected at the polygon mirror 3 rotating in the arrow direction, and the electrified surface of the photoconductor drum 102 is scanned in the arrow direction in the figure with the laser light. Thereby, the electrostatic latent image is formed on the electrified surface of the photoconductor drum 102.

In the present device, the SOS sensor 6 is disposed at a position before the scanning start position near the photoconductor drum 102, and based on a signal detected by the SOS sensor 6, an output start timing of image data on each scanning line is controlled, and the rotational speed of the polygon motor 18 at the time of steady rotation is also controlled.

As the output start timing of image data using the SOS sensor 6 is publicly known, and is not directly related to the scope of the present invention, the description is omitted herein.

Further, in the present device, a frequency generator (FG amplifier) 35, which detects rotation of an output shaft of the polygon motor 18, is provided near the output shaft, and based on an FG pulse detected by the FG amplifier 35, the rotation speed of the polygon motor 18 at the time of activating the device is controlled.

The functional blocks other than the laser diode 1, the polygon mirror 3, the photoconductor drum 102, the SOS sensor 6, the polygon motor 18, and the image data, described in the figure, constitute the control unit 10 of the present invention. In the control unit 10, an image forming apparatus optical scanning program of the present invention is read by the CPU 16 and predetermined operation is performed. Further, the image forming apparatus optical scanning program can be stored in a storage unit, provided to the control unit 10, and read by the CPU 16, or can be executed by means of a cloud. The storage unit corresponds to a storage medium of the present invention. Further, the image forming apparatus optical scanning program of the present invention can be provided by being stored in an external storage medium and introduced to the image forming apparatus.

Figure 4:
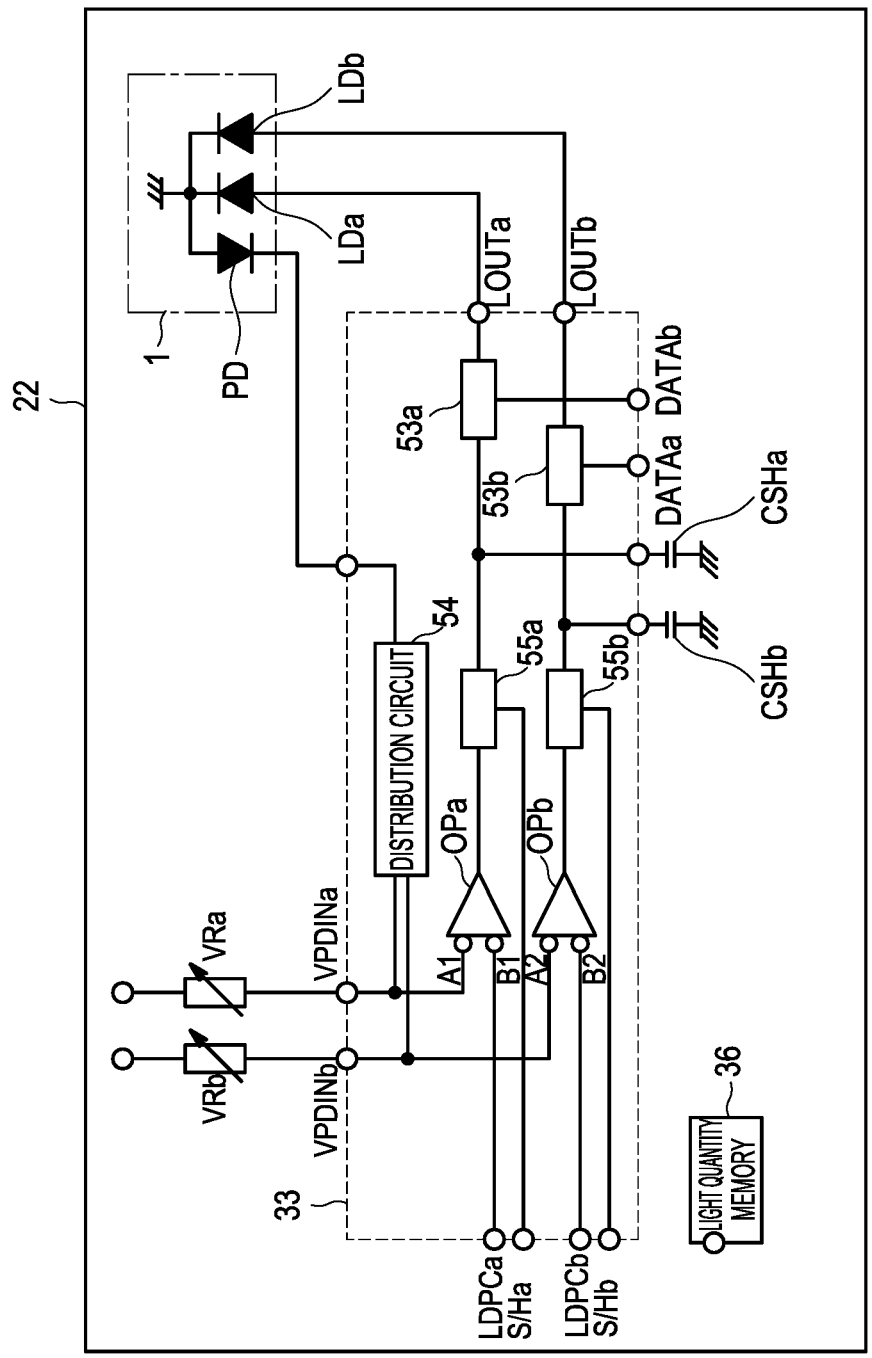
FIG. 4 is a diagram illustrating functional blocks of a laser drive circuit 22 which is a driver of a laser diode 1 of the same.

FIG. 4 illustrates exemplary functional blocks of the laser drive circuit 22 which is a driver of the laser diode 1.

In the laser diode 1, a light receiving element (photodiode: PD) for detecting light quantities of respective two light emitting elements LDa and LDb is incorporated. Drawing on the photoconductor drum 102 is performed by the light emitting elements LDa and LDb on two lines simultaneously through one scanning.

A light receiving signal output from the photodiode PD is input to a distribution circuit (current mirror circuit) 54. The output side of the distribution circuit 54 is connected with resistances VRa and VRb connected with the power supply, and with input terminals A1 and A2 of comparative circuits OPa and OPb. The distribution circuit 54 allows to generate the same current for the respective light emitting elements LDa and LDb based on the input light receiving signal, and converts the distributed current into voltages respectively and outputs to the terminals A1 and A2. The terminals A1 and A2 are input terminals on one sides of the comparative circuits OPa and OPb. To input terminals B1 and B2 of the other sides of the comparative circuits OPa and OPb, light quantity control signals LDPCa and LDPCb are input.

Between the output sides of the comparative circuits OPa and OPb and the drivers 53a and 53b of the light emitting elements LDa and LDb, negative feedback circuits consisting of sample hold circuits 55a and 55b and capacitance CSHa and CSHb are connected. To the drivers 53a and 53b, image data DATAa and DATAb are input.

Either one of light emitting signals S/Ha and S/Hb of the light emitting elements LDa and LDb, which perform light quantity adjustment, is activated. In the active one, a negative feedback circuit is formed, and automatic power control, having been conventionally well-known, is performed. In more detail, light quantity adjustment voltages LDPCa and LDPCb are compared with voltages caused by flowing the output current from the photodiode PD to the resistance VRa and VRb in the comparative circuits OPa and OPb. The differences at that time are charged or discharged to the capacitance CSHa and CSHb externally mounted to the sample hold circuits 55a and 55b, and drive currents output from the output terminals LOUTa and LOUTb to the light emitting elements LDa and LDb are adjusted.

Figure 5:
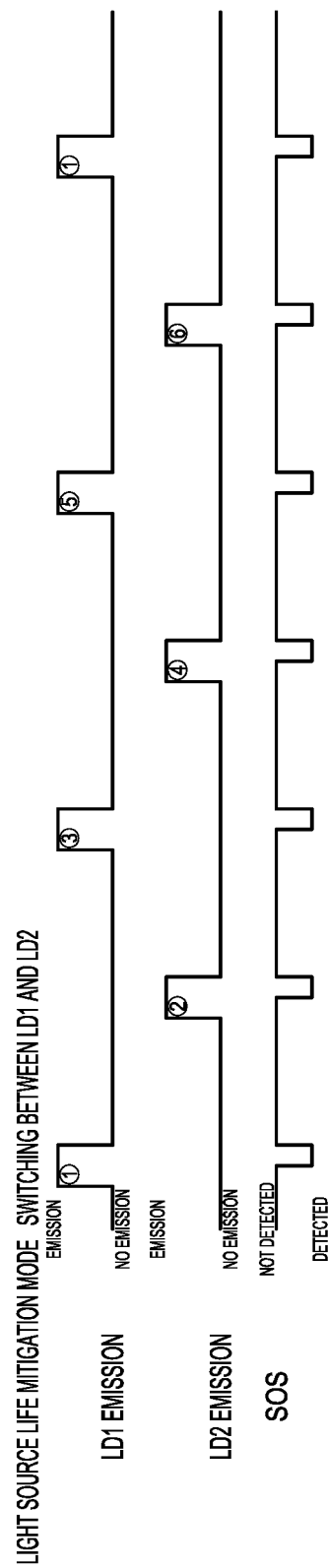
FIG. 5 is a time chart at the time of performing rotation control of a polygon mirror 3 by alternately outputting light beams by using two light sources.

FIG. 5 is a time chart at the time of performing rotation control of the polygon mirror 3 by alternately outputting light beams by using two light sources.

Further, at the initial startup of the image forming apparatus, either one of the light emitting signals S/Ha and S/Hb of the light emitting elements LDa and LDb is activated, and in the active one, a negative feedback circuit is formed and charging is made to either one of the capacitance CSHa and CSHb externally mounted to the sample hold circuits 55a and 55b. Thereby, when the light quantity of the light emitting element LDa or LDb is increased gradually, the light is deflected by the polygon mirror 3 attached to the polygon motor 18 controlled by the FG control, and as scanning is performed on the SOS sensor 6, an SOS signal will be detected soon. The LD emission light quantity at the moment of detecting an SOS signal can be detected by the light receiving element (photodiode PD) for detecting respective light quantities of the LDa and LDb incorporated in the laser diode 1.

It should be noted that while this example describes that a plurality of light sources are included, a single light source is also acceptable in the present invention.

Figure 6:
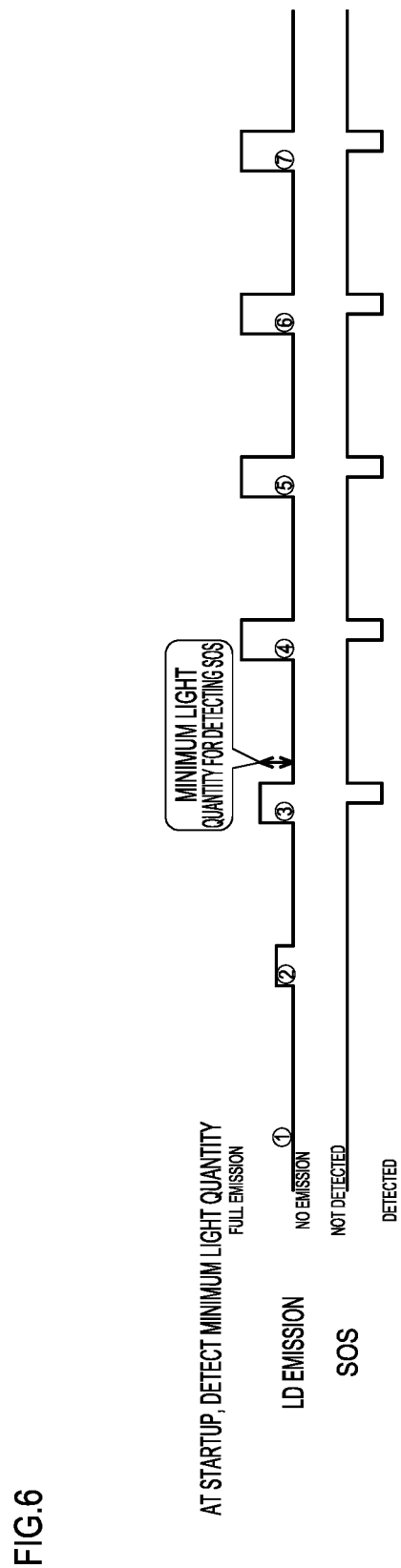
FIG. 6 is a time chart when an output of a light source is increased gradually and the output is first detected by a SOS sensor.

FIG. 6 is a time chart illustrating the case where an output of a light source is increased gradually and the output is detected by the SOS sensor 6 for the first time.

The LD emission light quantity at the moment of detecting an SOS signal can be stored in the light quantity memory 36, and in a light source life mitigation mode, it can be used as a lower limit threshold for suppressing the output of the light source. By setting a light quantity between a normal light quantity and the threshold light quantity, it is possible to perform rotation control of the polygon motor 18, that is, the polygon mirror 3, by the SOS sensor 6 while suppressing the output of the light source.

Figure 7:
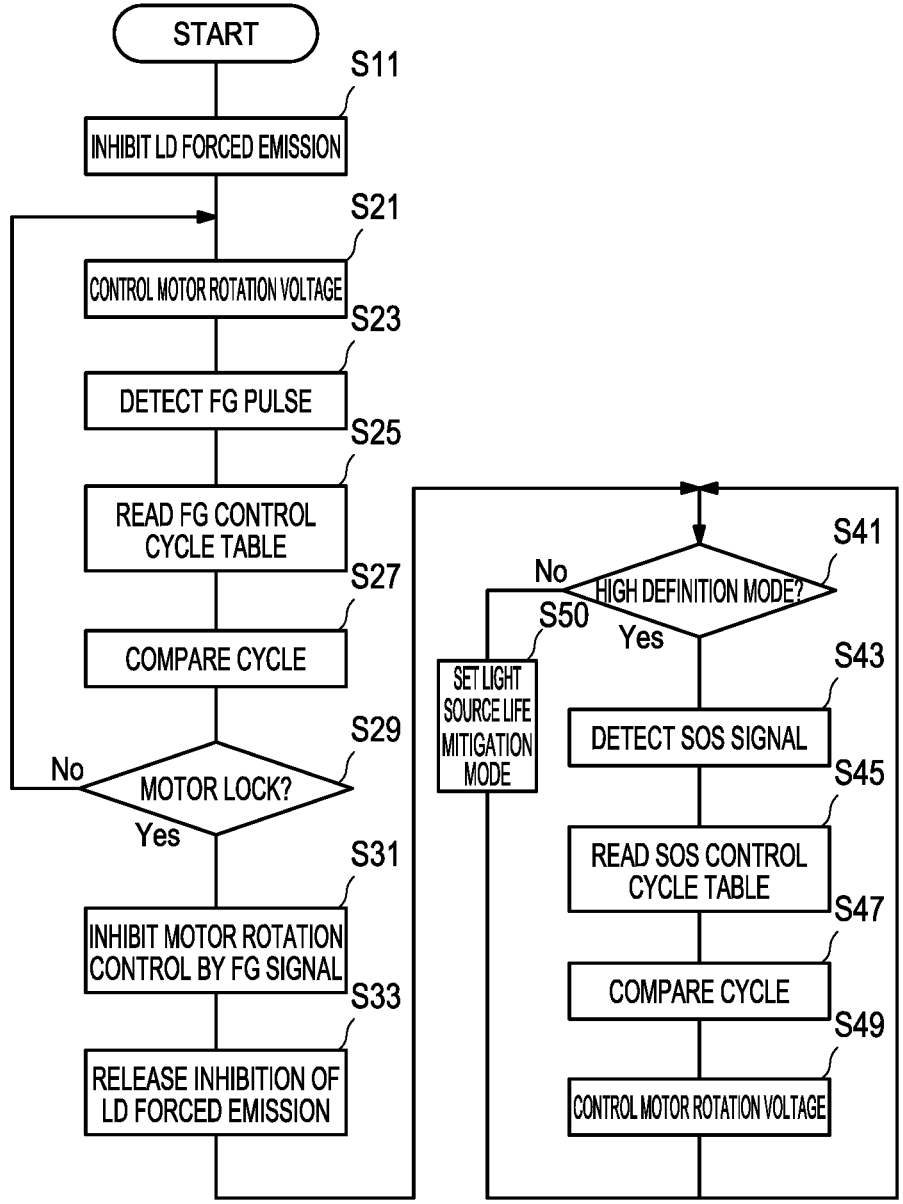
FIG. 7 is a flowchart illustrating a procedure of motor control.

Hereinafter, speed control of the polygon motor 18 will be described based on the flowchart of FIG. 7 illustrating the procedure of the motor control.

When the present device is activated, firstly, forced emission of the laser diode 1 is inhibited (S11). This means that light emission of a laser intended to be received by the SOS sensor 6 (=performed irrelevantly to image signal) is inhibited.

Next, the rotational speed of the polygon motor 18 detected by a detection element such as a hall element or a rotary encoder is input, as a FG pulse, to the CPU 16 via the FG (frequency generator) amplifier 35 (S23). Further, a reference cycle is read from an FG control cycle table 51, and is input to the CPU 16 (S25).

In the CPU 16, the cycle of the FG pulse is compared with the reference cycle (S27), and based on the comparison result, a control amount of the rotational speed of the polygon motor 18 is computed by a rotational frequency computing unit 11. Further, based on the computation result, a drive voltage which should be supplied to the polygon motor 18 is computed by the rotation control voltage computing unit 15, and the drive voltage value is commanded to the motor drive circuit 31 (S21). The motor drive circuit 31 drives the polygon motor 18 at the commanded drive voltage. In this way, the polygon motor 18 is controlled to have a desired rotational speed corresponding to the control amount computed by the rotational frequency computing unit 11.

The rotational speed control described above (=rotational speed control based on the FG pulse) is continued until when the polygon motor 18 reaches the steady rotation speed and a motor lock signal indicating the fact is input from the FG amplifier 35 to the CPU 16 (S29).

When the polygon motor 18 reaches the steady rotation speed through the rotational speed control described above and a motor lock signal is detected (S29; YES), control of the drive voltage of the polygon motor 18 based on the FG pulse is inhibited (S31), and inhibition of forced emission of the laser diode 1 (see step S11) is released (S33). If a motor lock signal is not detected (S29; NO), the processing returns to step S21.

Next, it is determined whether or not the mode is a high definition mode during a job or within a predetermined time after a job (S41). After a job ends, if a subsequent print command does not come within a predetermined time after printing, the mode is switched to a light source life mitigation mode described below. If a subsequent print command comes until that time, the high definition mode is continued.

During the high definition mode (S41; YES), a detection signal of laser light by the SOS sensor 6 is input to the CPU 16 (S43). Further, the reference cycle is read from the SOS control cycle table 52, and is input to the CPU 16 (S45).

In the CPU 16, the cycle of the SOS signal is compared with the reference cycle (S47), and based on the comparison result, a control amount of the rotational speed of the polygon motor 18 is computed by the rotational frequency computing unit 11. Further, based on the computation result, the rotation control voltage computing unit 15 computes a drive voltage which should be supplied to the polygon motor 18, and the drive voltage value is commanded to the motor drive circuit 31 (S49). The motor drive circuit 31 drives the polygon motor 18 at the commanded drive voltage. In this way, the polygon motor 18 is controlled to have a desired rotational speed corresponding to the control amount computed by the rotational frequency computing unit 11 with high accuracy. It should be noted that the level of high accuracy is a relative one with respect to the accuracy during standby.

In order to realize the control described above, in the present device, the laser diode 1 is forced to emit light at timing that a laser beam, with which scanning is performed repeatedly in the arrow direction in the figure along with rotation of the polygon mirror 3, passes through the position on the SOS sensor 6. As such, although the laser diode 1 should be turned off originally because there is no image data at this timing, as it is necessary to detect a signal by the SOS sensor 6, to determine image data output timing of the line based on the signal, and to control the rotational frequency of the polygon motor 18 as described above, the laser diode 1 is turned on regardless of the image data. Further, data for this process is given to the laser drive data generation circuit 21 from a forced emission ON/OFF control unit 13 based on a command from a forced emission timer 14.

If the mode is not the high definition mode (S41, NO), the processing is switched to the light source life mitigation mode (S50), and rotational speed control during standby is performed with setting described below, and then the process is transferred to step S41.

Next, a time chart regarding light source output in the light source life mitigation mode will be described based on FIGS. 8A to 8C.

FIG. 8A is a timing chart illustrating the high definition mode at the time of image formation or at the time of normal irradiation within a predetermined time for image formation after a job ends. Each of the surfaces of the polygon mirror has light emission for obtaining an SOS signal, and the SOS sensor 6 detects a light beam accordingly. Further, in an image region, an image is printed.

On the other hand, FIG. 8B is a timing chart in which the mode is switched to the light source life mitigation mode and an SOS signal is detected by every other surface of the surfaces of the polygon mirror. By making changes to the rotational frequency computing unit (cycle computation) 11 and the forced emission control unit 13, it is possible to detect an SOS signal using every other surface and reduce the total amount of the lighting period of the laser diode 1, whereby the life can be improved.

In FIG. 8C, the mode is switched to the light source life mitigation mode, and an irradiation period at the time of irradiation of each surface of the polygon mirror is set to be shorter. At the time of normal irradiation, an irradiation period for each surface is set to have an extra time. When high accuracy rotation control is not required, there is no problem in reducing the irradiation period for each surface. As such, it is possible to realize a longer life by reducing the irradiation period of the light source.

FIG. 9D is a timing chart in which the mode is switched to the light source life mitigation mode and the magnitude of the LD emission quantity is set to two third. In rotation control not requiring high accuracy, it is possible to perform rotation control by reducing the light emission quantity.

In FIG. 9E, the mode is switched to the light source life mitigation mode, and the LD emission quantity is set to be one third, but as it is impossible to detect SOS as it is, the SOS gain is increased so as to enable an SOS signal to be detected. If the gain of the sensor itself is increased, as the rotational accuracy and the printing position accuracy deteriorate, it is not performed during printing. However, there is no problem during standby.

While the present invention has been described based on the embodiment described above, the present invention is not limited to the above-described embodiment, and changes can be made to the embodiments as appropriate.

The present embodiment has an advantageous effect of fully establishing noise prevention, an increase in the life of a laser light source, and reduction of a first printing time, during standby of the image forming apparatus.

What is claimed is:

1. An image formation optical scanner configured to perform scanning with a light beam and perform irradiation on a photoreceptor for image formation, the optical scanner comprising:
    a light source configured to emit a first light beam based on image data and a second light beam based on a forced emission command;
    a rotating polygon mirror including a plurality of mirror surfaces from which the first light beam and the second light beam output from the light source are reflected;
    a drive unit that rotationally drives the rotating polygon mirror;
    a beam detection unit that detects the second light beam reflected from the rotating polygon mirror; and
    a control unit that receives the image data, provides the forced emission command, and controls the light source according to the forced emission command and the received image data, the control unit having modes for controlling the drive unit to adjust a rotational speed of the rotating polygon mirror based on detection of the second light beam by the beam detection unit, the modes including a high definition mode and a light source life mitigation mode, wherein
    when in the high definition mode, the control unit controls the light source to emit the first light beam and the second light beam repeatedly, and
    when in the light source life mitigation mode, the control unit controls the light source to emit the second light beam repeatedly and not emit the first light beam.

2. The image formation optical scanner according to claim 1, wherein
    the control unit cyclically outputs the second light beam from the light source, and when in the light source life mitigation mode, the control unit performs rotation control of the drive unit by the second light beam which is output from the light source toward the mirror surfaces of the rotating polygon mirror, wherein output of the second light beam skips n (n represents one or larger natural number) of the mirror surfaces of the rotating polygon mirror.

3. The image formation optical scanner according to claim 1, wherein
    when in the high definition mode, the control unit sets a first emission duration for the second light beam,
    when in the light source life mitigation mode, the control unit sets a second emission duration for the second light beam, and the second emission time duration is less than the first emission time duration.

4. The image formation optical scanner according to claim 1, wherein
    when in the high definition mode, the control unit sets a first emission output level for the second light beam,
    when in the light source life mitigation mode, the control unit sets a second emission output level for the second light beam, and the second emission output level is less than the first emission output level.

5. The image formation optical scanner according to claim 4, wherein
    when in the high definition mode, the control unit sets a first gain for the beam detection unit,
    when in the light source life mitigation mode, the control unit sets a second gain for the beam detection unit, and the second gain is greater than the first gain.

6. The image formation optical scanner according to claim 4, wherein
at a time of startup of the optical scanner, the control unit sets an emission output level for the second light beam that would result in no detection of the second light beam by the beam detection unit and then gradually increases the emission output level for the second light beam, acquires and stores the emission output level corresponding to when the beam detection unit begins to detect the second light beam, and determines, based on the stored emission output level, the emission output level for the second light beam to be used for the light source life mitigation mode.

7. The image formation optical scanner according to claim 1, wherein
a plurality of the light sources are provided, and
in the light source life mitigation mode, the control unit outputs the second light beam while switching outputs from the light sources.

8. An image forming apparatus comprising:
an image forming unit including:
an exposing device including the image formation optical scanner according to claim 1; and
a photoreceptor in which an image is formed by the exposing device according to the first light beam reflected from the mirror surfaces of the polygon mirror, wherein
the control unit that controls the optical scanner performs control of image formation in the image forming unit.

9. The image forming apparatus according to claim 8, wherein
the control unit switches from the high definition mode to the light source life mitigation mode when a subsequent print command does not come within a predetermined time after an end of printing.

10. A non-transitory computer-readable recording medium storing an image forming apparatus optical scanning program to be executed in an optical scanner, the optical scanner being configured such that a light source of the optical scanner emits a first light beam based on image data and a second light beam based on a forced emission command, the first light beam reflected from a plurality of mirror surfaces of a rotating polygon mirror to a photoreceptor for image formation, the second light beam reflected from the plurality of mirror surfaces of the rotating polygon mirror to a beam detection unit for adjusting a rotational speed of the rotating polygon mirror based on detection of the second light beam by the beam detection unit, wherein
the program includes:
instructions for modes to adjust the rotational speed of the rotating polygon mirror, the modes including a high definition mode and a light source life mitigation mode, wherein the instructions include
high definition mode instructions that control the light source to emit the first light beam and the second light beam repeatedly, and
light source life mitigation mode instructions that control the light source to emit the second light beam repeatedly and not emit the first light beam.

* * * * *